June 14, 1938. K. E. HUNT 2,120,281
METHOD OF PRODUCING PERMEABLE BODIES
Filed July 31, 1936
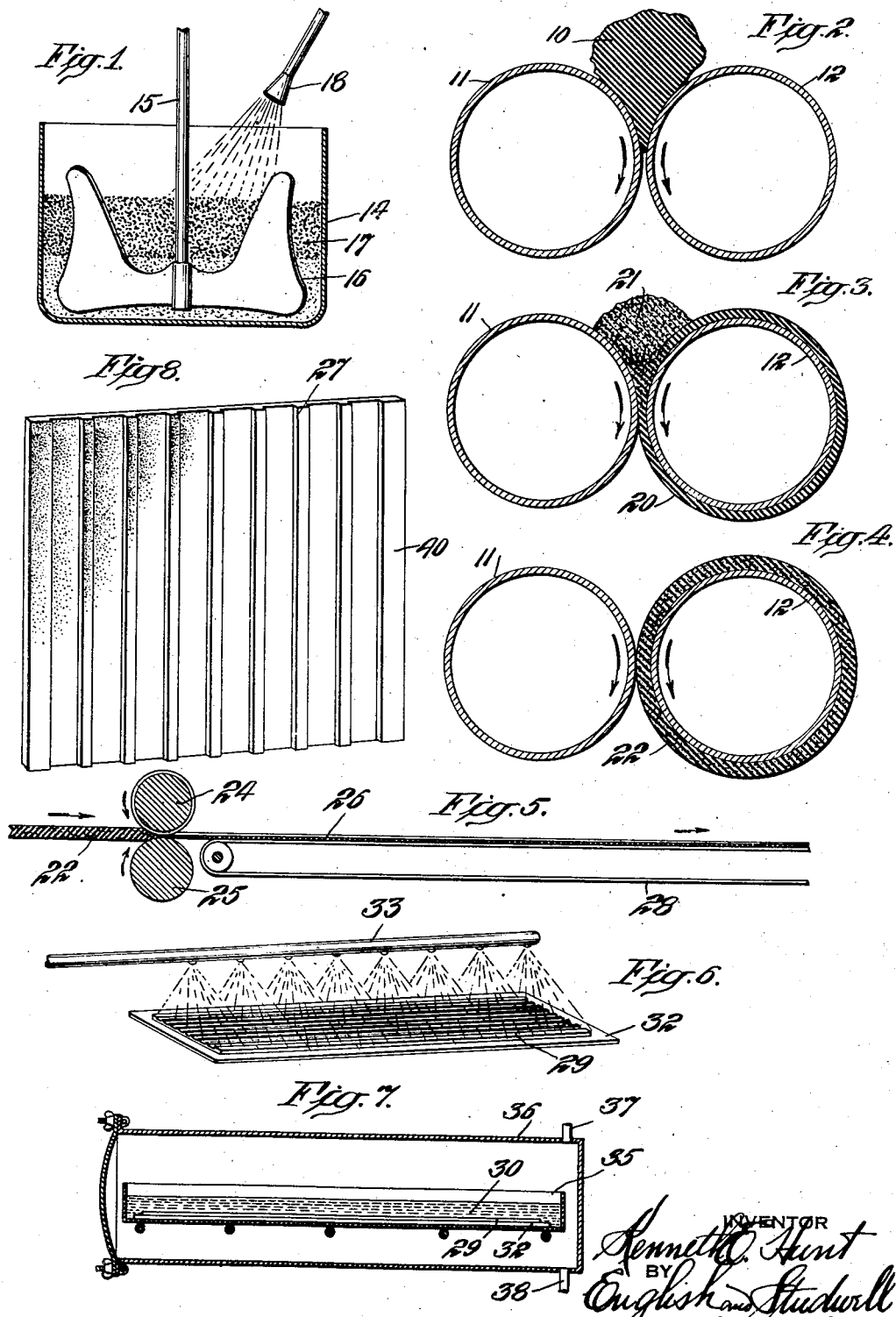

Patented June 14, 1938

2,120,281

UNITED STATES PATENT OFFICE 2,120,281

METHOD OF PRODUCING PERMEABLE BODIES

Kenneth E. Hunt, Paquannock, N. J., assignor to American Hard Rubber Company, New York, N. Y., a corporation of New York Application July 31, 1936, Serial No. 93,721

8 Claims. (Cl. 18—53)

This application is a continuation in part of my pending application Serial No. 45,436, filed October 17, 1935.

The invention relates to an improvement in methods of producing permeable bodies adapted for use as separators for storage batteries, as filters for chemical purposes, and for other uses. For the sake of illustration the invention will be described in connection with the production of permeable sheets or plates adapted for use as filters and more especially as separators between the cathode and anode plates of storage batteries of the lead-acid type, but it will be understood that the invention is not to be limited to the production of filter and separator plates, since it is equally applicable to the production of permeable bodies of diverse shapes adapted for various uses.

It has been proposed heretofore to produce filter plates and storage battery separators composed essentially of minute porous particles, such as fine sawdust, pumice, infusorial or diatomaceous earth, hard silica gel and the like, held together as a porous body by vulcanized rubber or rubber-like material. These porous-particle and rubber-binder plates which have been used as storage battery separators have not, as heretofore constructed, given satisfaction in several particulars:—They have lacked the necessary physical strength for the uses to which they are put; when subjected to mechanical pressure many of them lose their porosity; and some have not sufficient resistance to the chemical reactions to which they are subjected. Most if not all of the proposed porous-particle and rubber-binder storage battery separators heretofore proposed are defective in one or more of the foregoing particulars. The result is that wood is still in general use for separators for storage batteries. But wood is recognized as an unsatisfactory material for these separators because of its relatively short life or period of usefulness. It deteriorates in service and warps and cracks when drying out after being saturated so that it is unfit for further use. Wood separators can not be transported in the dry, fully-charged condition of the battery. Wood separators also crack if the electrolyte is permitted to remain at a low level for some time. For these and other reasons the efforts of the art are still directed toward producing a permeable body which will perform the functions of a storage battery separator more efficiently and have a longer life and greater strength than wood and the porous-particle and rubber-binder separators heretofore proposed.

The object of the present invention is to produce permeable bodies such as filters, and more especially storage battery separators having a higher degree of porosity, less electrical resistance, greater physical strength, and greater resistance to chemical reactions, than the porous-particle and rubber-binder storage battery separators heretofore proposed or put on the market. To this end the invention consists in a new and improved manner of treating the porous particles before admixture with the rubber binder material, and the further novel treatment of the mixture after formation into sheet or other form to assure the highest degree of porosity attainable with the materials used and therefore the greatest degree of efficiency.

For the purpose of rendering the description of the novel method more readily understandable, there is illustrated diagrammatically in the accompanying drawing the steps whereby a hard-rubber porous-particle separator plate is produced. Fig. 1 indicates the device for mixing the silica gel or other porous particles and the hard rubber dust while thoroughly wetting them; Fig. 2 indicates the two rolls for masticating the rubber composition binder; Fig. 3 indicates the same rolls incorporating the wetted porous particles into the masticated rubber; Fig. 4 indicates the rolls on the completion of the mixing operation; Fig. 5 illustrates the rolls of the calender for pressing the rubber-binder porous-particle mixture into the desired form; Fig. 6 illustrates the spraying of the porous separator sheet while spread on a slab; Fig. 7 indicates the vulcanizer in which the sheet is cured; and Fig. 8 is a perspective view of a separator plate produced according to the invention.

The porous particles which may be used in the storage battery separator or other permeable body may be those commonly employed in this type of separator, such as fine sawdust, pumice, finely ground cereals and the like, but I prefer to use finely-comminuted, hard, silica gel as disclosed in the patent to Behrman, 1,784,981, either alone or in combination with other porous particles, such as porous rubber dust, finely ground pumice, diatomaceous earth, and the like. The silica gel should be very finely comminuted, and should preferably weigh less than twenty-eight pounds per cubic foot, since the lighter the silica gel the higher will be the porosity of the separator.

The binder for holding the porous particles together in the sheet, plate or other body form may be the usual hard rubber compound which on vulcanization becomes a substance similar to that known as ebonite, such hard rubber compound usually consisting of rubber in any form, such as smoked sheet, plantation or wild rubber, or reclaimed rubber, mixed with the necessary amount of sulphur, fillers, softeners, hard rubber dust or scrap and an accelerator. Latex may also be used as a binder, alone or in combination with the usual fillers.

A highly satisfactory storage battery separator has been made from the following ingredients in substantially the given proportions:—

|  | Pounds |
|---|---|
| Smoked sheet | 100 |
| Sulphur | 50 |
| Stearic acid | 5 |
| Porous rubber dust | 24 |
| Silica gel | 226 |

In preparing the improved storage battery separator from a formula of this general type the rubber, indicated at 10 in Fig. 2, is first masticated to the desired degree of plasticity, as by the rolls 11 and 12, with or without the addition of stearic acid, or other substances of like nature commonly employed in the art. The masticated rubber is then thoroughly mixed with the sulphur, with or without one of the usual accelerators.

Before the silica gel and porous rubber dust (that is to say, scraps from broken or defective separators made according to the present method) are mixed with the rubber binder, the silica gel and the rubber dust are wetted down with 250 pounds of pure water in a receptacle 14 provided with a stirrer 15, as shown in Fig. 1. The silica gel is indicated at 16 and the hard rubber dust at 17. The water is supplied by the nozzle 18. The amount of water used is preferably between about 80 and 120 per cent of the dry weight of the silica gel and the porous rubber dust. This wetting of the silica gel and the porous rubber dust with water before mixing them with the rubber binder amounts to a partial soaking or imbuing and is done partly to increase the capacity of the rubber to take up a large amount of the silica gel and porous rubber dust, but mainly in order to increase the porosity of the separator. It seems that the water prevents the rubber binder from closing up the pores of the silica gel and porous rubber dust, and also prevents the uncured rubber from sticking too tightly to the surfaces of the porous particles, since the water not only enters the pores of the particles but adheres to the surfaces of the particles. The wetting and mixing of the silica gel and porous rubber particles causes them to adhere together in a large dough-like mass, as indicated at 21 in Fig. 3.

After the particles of silica gel and porous rubber dust have been thoroughly wetted or partially soaked with water they are mixed in the usual way, as by milling, with the rubber binder material. This step is indicated in Fig. 3, in which the masticated rubber is shown at 20 and the mixture of agglomerated hard rubber and silica gel particles at 21, it being understood that the rolls are movable toward and from each other. When the mixing has been carried on to such extent that the porous particles are uniformly distributed throughout the rubber mass, the composition, indicated at 22 in Fig. 4, is cut from the roll 12 and is then calendered, molded or extruded into sheets or other suitable form. The calendering of the hard-rubber porous-particle composition 22 is performed by the rolls 24 and 25 of Fig. 5, the upper roll 24 being fluted to produce on one surface of the sheet 26 the ribs 27, best indicated on the completed separator plate 40 shown in Fig. 8. The continuous sheet of ribbed hard-rubber porous-particle material is conveniently discharged onto an endless belt 28, and an operator cuts it into convenient lengths as indicated at 29 in Fig. 6.

Although the porous particles are uniformly distributed throughout the mass of rubber binder in order to produce a separator or filter of uniform porosity throughout its entire area, it will be understood from the proportions of the ingredients of the porous-particle and rubber-binder composition given above, that there is insufficient rubber binder to coat the porous particles with a film of rubber, and that consequently a fair proportion of the porous particles directly contact with each other, although held together in the mass by the rubber binder interspersed between them. By this arrangement the porosity of the finished article is greatly increased over such permeable bodies as those in which the proportion of rubber used is sufficient to entirely coat the porous particles.

When the separator plate or other permeable body in strip or sheet form is discharged from the calender or extrusion machine it is vulcanized in the usual water bath, indicated at 30 in Fig. 7. Before immersing the permeable body in the water bath it has been found preferable to spray it with hot water in order to drive out from the strip the air contained in the pores thereof and the interstices between the porous particles and the rubber binder. The temperature of the hot water spray may range from about 100° F. to about 210° F., and in practice the spray water is usually about 180° F. This step is conveniently performed as indicated in Fig. 6, in which the fluted strip 29 of the hard rubber porous-particle material is spread flat on a metal slab 32 to receive the spray of hot water from the pipe 33. When substantially all the air in the permeable body has been replaced by water so that its specific gravity is greater than water, the permeable body is immersed in the water bath and vulcanized in the presence of steam.

In performing the vulcanizing step the slab 32 with the fluted separator strip 29 thereon is placed in a tank 35 containing the water bath 30. This assemblage is then rolled into a vulcanizer 36 of usual construction and supplied with steam through the pipe 37, the condensate passing out through the pipe 38.

When the permeable body is to be used as a separator plate for batteries, it has been found desirable in order to produce straight flat plates to place the strip 29 of permeable body when it has been discharged from the calender or extruding machine on the straight flat slab 32 of metal, preferably aluminum to facilitate handling. The strip of permeable material, which is conveniently about four feet long, and of any desired width, usually from about 4 to 8 inches, is spread out smooth on the metal slab, and then is subjected to the spray of hot water for about a minute, this being usually sufficient to drive out all the air from the strip and replace it with water so that its specific gravity is greater than that of water. On the completion of the spraying step the soaked strip is pressed down flat against the metal slab in order to drive out all air between the strip and slab so that the strip will lie perfectly flat against the slab. A brush is a convenient means for smoothing out the strip against the slab.

The strip of permeable material is now in condition for vulcanization in the water bath. The metal slab with the strip thereon is immersed in the water bath 30 in the tank 35 and subjected to live steam in the vulcanizer 36 at a pressure of about 60 pounds—equivalent to a temperature of about 308° F.—for a period of about four hours. On completion of the vulcanization the strip of permeable material has a coefficient of vulcanization within the range of true ebonite and is highly resistant to chemical reactions and especially those present in the usual storage batteries. If the strip of permeable material is to be used for separator or filter plates it is first thoroughly dried and then cut into lengths requisite for the separator or filter plates. A separator plate of about .05 web thickness has, after calendering, a resistance of about .35 ohm per square inch. After soaking the separator strip by spraying it with hot water until the air in the pores and interstices of the strip is replaced by water, the resistance of the strip is reduced to about .04 ohm per square inch.

The spraying of the separator sheets or strips before vulcanization causes them to swell considerably in all directions, thereby indicating that the rubber binder holding the porous particles together in the sheet or strip form has expanded and that the interstices are formed either in the body of the rubber itself or between the rubber and the porous particles. It is important before placing the sheet or strip in the water bath of the vulcanizer that it has absorbed its full capacity of water and that there is substantially no air left in the sheet or strip, since otherwise it would float in the water bath, resulting in an uneven, crooked and warped sheet not suitable for use.

If the permeable body is of such form that it can not be calendered or extruded but must be molded, it is desirable in imparting the greatest possible degree of porosity to the permeable body that it be soaked in water for several hours before vulcanizing. The length of time the molded permeable body should remain in the water before vulcanization will of course depend on its size and form, but it has been found that about eight hours of soaking is usually sufficient.

It will be understood that the invention is not to be limited to the proportionate quantities of the ingredients given in the illustrative example, nor to the particular ingredients named, since the improved method is applicable to the production of permeable bodies composed of rubber or rubber-like binders of any suitable composition holding together any suitable, finely-comminuted porous particles.

I claim:—

1. The method of producing a permeable body of the character described comprising, wetting porous, dry, hard, non-swelling particles with sufficient water to penetrate into the particles and close the pores thereof, mixing the wetted particles with a solid vulcanizable rubber-like binder of sufficient quantity to hold the particles together but insufficient to interfere substantially with the porosity of the particles, forming the mixture into a body of the desired shape, soaking the body in water until it absorbs enough to sink in water and then vulcanizing the body immersed in water in the presence of steam.

2. The method of producing a permeable body of the character described comprising wetting dry, hard, porous, non-swelling particles of silica gel with water in quantity sufficient to enter the pores of the silica gel particles and coat the particles, mixing the wetted particles with a vulcanizable rubber-like binder to hold the particles together as a porous body, forming the mixture into a body of the desired shape, soaking the body in water and then vulcanizing the body immersed in water in the presence of steam.

3. The method of producing a permeable body of the character described comprising wetting finely-comminuted particles of dry, hard, porous, non-swelling silica gel with water in quantity sufficient to coat the outer surfaces of the particles, then mixing the wetted particles with a vulcanizable rubber-like binder of sufficient quantity to hold the particles together as a porous body but insufficient to completely coat the individual particles with a film of rubber, forming the mixture into a sheet, soaking the sheet with hot water of about 100° F. to about 210° F. until substantially all air in the sheet is replaced by water, and then vulcanizing the sheet immersed in water in the presence of steam at about 308° F. for about four hours.

4. The method of producing a permeable body of the character described comprising wetting finely-comminuted particles of dry, hard, porous, non-swelling silica gel with water to coat the outer surfaces of the particles with water, then mixing the wetted particles with a vulcanizable rubber-like binder of sufficient quantity to hold the particles together as a permeable body but insufficient to cover completely the individual particles with a film of rubber, forming the mixture into a sheet of from about .03 inch to about .20 inch in thickness with raised ribs, spraying the sheet with water at about from 100° F. to about 210° F. for about one minute to cause the sheet to expand in all directions, and then vulcanizing the sheet immersed in water in the presence of steam at about 308° F. for about four hours.

5. The method of producing a permeable body of the character described comprising forming a mixture of the following ingredients in substantially the proportions given:—smoked sheet, 100 lbs., sulphur, 50 lbs., stearic acid, 5 lbs., porous rubber dust, 24 lbs., and dry, hard, porous, non-swelling particles of silica gel, 226 lbs., said method consisting of masticating the smoked sheet and stearic acid to the desired degree of plasticity, wetting the silica gel and porous rubber dust particles with water, then mixing the wetted particles with the rubber binder and sulphur until the porous particles are distributed substantially uniformly throughout the mass, then forming the mixture into sheets having ribs on at least one side thereof, spraying the sheets with hot water until substantially all air in them is replaced by water, and then vulcanizing the sheets immersed in water in the presence of steam.

6. In the method of producing a permeable body in flat sheet form of the character described, the step of laying the sheet flat upon a slab, spraying the sheet with hot water until substantially all air in the sheet is replaced by water, then immersing the slab with the sheet lying flat against it in a water bath, and then vulcanizing the sheet while immersed in the water in the presence of steam.

7. In the method of producing a permeable body in flat sheet form of the character described, the steps of preparing a permeable sheet consisting of porous particles and a vulcanizable rubber-like binder, laying the sheet flat against a metal slab, spraying the sheet with water at a temperature of about 100° F. to 210° F. until the air in the sheet is replaced by water, smoothing the sprayed sheet flat against the slab to drive out any air between the sheet and the slab, immersing the slab and sheet in a bath of water and vulcanizing the sheet in that condition with steam at about 308° F. for about four hours.

8. In the method of producing a permeable body in flat sheet form consisting of a mixture of porous particles and a vulcanizable rubber-like binder, the steps of laying the sheet of permeable material flat against a metal slab, spraying the sheet with hot water until substantially all air in the sheet is replaced by water, and then vulcanizing the sheet in water while still on the slab.

KENNETH E. HUNT.